(12) United States Patent
von Groll

(10) Patent No.: US 8,078,616 B2
(45) Date of Patent: Dec. 13, 2011

(54) METHOD OF QUANTITATIVE ANALYSIS OF CORPORATE COMMUNICATION PERFORMANCE

(75) Inventor: Goetz von Groll, Zurich (CH)

(73) Assignee: Factiva, Inc., Monmouth Junction, NJ (US)

( * ) Notice: Subject to any disclaimer, the term of this patent is extended or adjusted under 35 U.S.C. 154(b) by 1341 days.

(21) Appl. No.: 10/604,906

(22) Filed: Aug. 26, 2003

(65) Prior Publication Data

US 2005/0060288 A1  Mar. 17, 2005

(51) Int. Cl.
*G06F 17/30* (2006.01)
(52) U.S. Cl. ........................................................ 707/732
(58) Field of Classification Search ........................ None
See application file for complete search history.

(56) References Cited

U.S. PATENT DOCUMENTS

| | | | |
|---|---|---|---|
| 6,622,140 B1 * | 9/2003 | Kantrowitz | 1/1 |
| 6,789,076 B1 * | 9/2004 | Dutta | 707/765 |
| 7,117,198 B1 * | 10/2006 | Cronin et al. | 707/3 |
| 7,337,135 B1 * | 2/2008 | Findlay et al. | 705/35 |
| 7,376,610 B2 * | 5/2008 | Schneider | 705/36 R |
| 2002/0042792 A1 * | 4/2002 | Nishioka et al. | 707/5 |
| 2002/0169658 A1 * | 11/2002 | Adler | 705/10 |
| 2002/0174000 A1 * | 11/2002 | Katz et al. | 705/7 |
| 2003/0033295 A1 * | 2/2003 | Adler et al. | 707/3 |
| 2003/0078914 A1 * | 4/2003 | Witbrock | 707/3 |
| 2004/0114571 A1 * | 6/2004 | Timmins et al. | 370/352 |
| 2005/0144114 A1 * | 6/2005 | Ruggieri et al. | 705/37 |

* cited by examiner

*Primary Examiner* — Bai D Vu
(74) *Attorney, Agent, or Firm* — Dorsey & Whitney LLP

(57) ABSTRACT

A method for the analysis, benchmarking, and finally improvement of communications pertaining to the field of public relations is described. The methodology is based on a massively quantitative approach suitable for numerical processing. Furthermore, it takes into account data outside the realm of communications and the press, such as a company's commercial and financial market performance to normalise the quantitative results and facilitate comparisons between competitors. Taking into account proprietary data such as the communication budget of a client the performance of the communications effort can be benchmarked objectively. Finally, the method offers the resulting key performance indicators to a wide audience within the client company in a "cock-pit" style manner.

13 Claims, 18 Drawing Sheets

Search Set Name: test search set
Source Name: Factive ▼

Search Date Range: [01]-[01]-[2000] To [01]-[01]-[2003]
By default, empty date entries will search all available articles. Dates are specified in (DD-MM-YY), with the first group representing the start date, with the second group representing the end date. Be sure to enter the full 4 digit year.

Common Criteria:
☐ Subject Equals contracts & orders

[Delete]

[Publisher Group ▼]  [Equals ▼]  [                    ]  [Add Common Criteria]

Search Permutations
Field Name        List
1. [Company ▼]    xx, yy, zz
2. [Language ▼]   aa, bb, cc
3. [▼]

[Save Search Set]

FIG. 5

| id | search id | generated_ne | last search | results |
|---|---|---|---|---|
| 18062 | 619 | london_(in=(in | 6/4/2003 6:35:47 PM | 159 |
| 18063 | 619 | paris_(in=(i83 | 6/4/2003 6:35:55 PM | 102 |
| 18064 | 619 | new_york_(in | 6/4/2003 6:36:06 PM | 171 |
| 18065 | 619 | toronto_(in=( | 6/4/2003 6:36:11 PM | 24 |
| 18066 | 619 | madrid_(in=( | 6/4/2003 6:36:15 PM | 82 |
| 18067 | 619 | moscow_(in= | 6/4/2003 6:36:20 PM | 64 |
| 18068 | 619 | leipzig_(in=(i8 | 6/4/2003 6:36:25 PM | 47 |
| 18069 | 619 | havana_(in=( | 6/4/2003 6:36:30 PM | 20 |
| 18074 | 624 | (china)_(hd=( | 6/4/2003 2:18:13 PM | 200 |
| 18075 | 625 | (china)_(hd=( | 6/4/2003 2:18:21 PM | 22 |
| 18076 | 626 | (hd=(3g_or_t | 6/4/2003 2:21:22 PM | 1341 |
| 18077 | 627 | (hd=(qualcorr | 6/4/2003 2:21:54 PM | 283 |
| 18078 | 628 | 2012_(london | 6/5/2003 11:49:20 AM | 230 |
| 18079 | 628 | 2012_(london | 6/5/2003 11:49:31 AM | 45 |
| 18080 | 628 | 2012_(london | 6/5/2003 11:51:01 AM | 431 |
| 18081 | 628 | 2012_(london | 6/5/2003 11:51:41 AM | 197 |
| 18082 | 628 | 2012_(london | 6/5/2003 11:54:14 AM | 939 |
| 18083 | 628 | 2012_(london | <NULL> | |
| 18084 | 628 | 2012_(london | <NULL> | |
| 18085 | 628 | 2012_(london | <NULL> | |
| 18086 | 628 | 2012_(london | <NULL> | |
| 18087 | 628 | 2012_(london | <NULL> | |

Result

Search 1 of 3; zenec_atacand_2535722 all_wires_2002-01-01_2003-05-31 (SOV_ProdPubSet)

Sample element 1 of 18; Current Article ID: 2134657

Total article counter 1 of 73

Title: EARNINGS PREVIEW: AstraZeneca Seen Highlighting Crestor...

Pub Source: Dow Jones International News   Pub Date: 28-Jan-2002

Word Number: 925   Language: English

Summary: of DOW JONES NEWSWIRES LONDON-(Dow Jones)- U.K. pharmaceutical company AstraZeneca PLC (AZN) is expected to focus on the forthcoming launch of its potential blockbuster drug Crestor, which lowers cholesterol, when the company releases full...

Favorability
○ Positive  ○ Negative  ○ Neutral  ○ Blank

Issue:

[New Search]  [Select]  [Save]

[Previous]  [Next]

| Search | | | | | | |
| --- | --- | --- | --- | --- | --- | --- |
| ○ □ × ▷ | | | | | | |
| Search Title | | | Company | | | |
| Oympc Eid | | | WPP | | | ▼ |
| DB | Read held | | Job | | | |
| 2z0b ▼ | lull ▼ | | _B2012_SOV | | | ▼ |
| Last executed at | Min word length | Max word length | SearchSet | | | |
| 1/6/203 2:08:00 PM | 4 | 15 | _B2012_SOV | | | ▼ |

SELECT abc.searchresults.DATEPARTImm,dbo searchresults.pub_datelAF [Month]
DATE[PART](yy, dbo searchresults. pub I As Year FROM dbo SearchResultsINNER JOIN
db0 SearchPelmedDN cbo.SearchREsults.searchrehmed_d - dbo.SearchRefned.id INNER JOIN
dob Search ON dbo.SearchRefined search_id=dob.Search ID
WHERE CONTAINS(searchresults.srippet,{PT} IAND searchresults.pub_date 15 NOT NULL AND search.searchnet_id={ID}
ORDER BY DATE PART I yy.searchresults pub_datel. DATE PART I mm.searchresults pub_date]

Target peer(s) (comma seperated)
London

| Mark | Search | Target peers | Read DB | Readfiled | Min word len | Max word len |
| --- | --- | --- | --- | --- | --- | --- |
| ☐ | OympicBid | Fiona | 2bDb | lull | 4 | 15 |
| ☐ | Search for for | Fiona | 2bDb | lull | 4 | 15 |
| ☐ | Search for Pa. | Palmano.Fiona | 2bDb | lull | 4 | 15 |
| ☐ | Lamoa | Lamcil.odinvest | 2bDb | lull | 5 | 15 |
| ☐ | Test For Eprex | proril | 2bDb | lull | 4 | 15 |

FIG. 8

METHOD OF QUANTITATIVE ANALYSIS OF CORPORATE COMMUNICATION PERFORMANCE

BACKGROUND OF INVENTION

The invention pertains to the field of operations research in corporate communication effectiveness. Reputation is a key driver of corporate and brand value. But fragmenting media and an increasingly connected economies are making reputation management increasingly difficult. Traditionally, public relations professionals, be they corporate staff or PR service providers, have been working with press clippings to analyse the coverage in selected publications of a particular company and its competitors. Naturally, there are only so many clippings a person can analyse, and the advent of articles that are electronically available through (internet) search engines and press data bases have alleviated problems of access, choice of articles, and a tailored articles sets as a result of electronic searches. However, these tools as such do not provide any further help in a holistic analysis process as described below, and the problem of judging the performance of the communications operations objectively persists. A company with a far larger market share (or indeed PR and advertising budget) will naturally have a wider press coverage than a smaller competitor, yet this in itself does not indicate how effectively the available resources are being utilised. Furthermore, the results of a quantitative analysis lend themselves to being displayed in a variety of graphs, allowing status and trends to be more easily monitored and communicated than by today's ubiquitous summary reports.

SUMMARY OF INVENTION

The invention provides a method to optimise the operation of communication planning and campaign execution. Reputation is a key value driver, central to the competitive advantage of every business, and it is not built through corporate communications alone. Therefore, the invention provides for the fact that reputation is an enterprise-wide concern, and managing it requires a real-time, enterprise-wide view and an audience that goes beyond the traditional PR employee to product responsible units and business area managers. It is important that business takes a strategic approach to reputation management, built on greater intelligence and clearer measurement, which is described in some detail below. The method can be partitioned into three layers, each layer provides input into the next, and each layer belongs to a higher level in the overall process of a communications operation than the preceding layer:

First, a diagnosis of a company's reputation in the media using quantitative tools to analyse media performance in the public press across a given competitor set. The quantitative insights are based on computational results such as counting articles, words or article mentions of a name or issue in the world press, by region, publication or format. Different weightings according to publication, type, article length or any other attributes are possible. This data is aggregated and analysed to produce trends that are then displayed as graphs. Furthermore, it takes into account data outside the realm of communications and the press, such as a company's revenue (in total or per region, product line, etc), market share, financial performance such as profitability and share price, and events such as quarterly/yearly reports to shareholders. This external data helps to normalise the quantitative results and facilitates comparisons between competitors of unequal size.

Secondly, using this knowledge and benchmarked best practice supports the tool-based process of identifying which metrics support the business and marketing objectives for each market, product or corporate message. Taking into account proprietary data such as the communication budget of a client the performance of the communications effort can be benchmarked objectively. By monitoring the changes in performance one builds the prerequisite for continuous process improvement into the organisation.

Thirdly, employees of the client company in product management and other strategic positions are given access to a web-based gallery of analysis results needed to build learning into their communications processes. The system offers the resulting key performance indicators in a "cock-pit" style manner. Up-to-date results in a concise presentation and convenient access are a necessary foundation for continuous operations improvement towards increasing the effectiveness of corporate communications.

This method provides benefits in the following areas: —Press management (more effective internal processes to deliver more targeted visibility at a lower cost), —Issue and crises management (identification of a reputation threat before it spirals out of control), —Message Optimisation (understanding the message strategy of competitors allows for better timing and placement of the client company's messages), and —Campaign benchmarking (return-of-investment measures for PR campaigns).

It should be noted that the described method is not only relevant for companies, but can just as well be applied to non-profit and non-governmental organisations, issues of general interest, matters of public policy, etc.

BRIEF DESCRIPTION OF DRAWINGS

FIG. 5: Sample entry form for search sets
FIG. 6: Table containing search status (last run, NULL for queued run)
FIG. 7: User interface for favourability rating of articles
FIG. 8: User interface for word frequency counter

DETAILED DESCRIPTION

The following description starts with the data sets that build the foundation of the methodology and system implementation: (i) articles, (ii) financials, and (iii) bench-marking inputs. The discussion continues with the tools built around these data sets such as (iv) data acquisition and housekeeping, (v) discovery, and (vi) visualisation of results. Finally, it is described how these tools are designed and packaged into tightly integrated processes (vii) analysis, (viii) benchmarking, and (ix) monitoring. The examples provided merely represent one possible embodiment of the invented method, and different embodiments of the discussed concepts are easily conceivable.

Article data sets: Any article has certain attributes (metadata) associated with it. These attributes are typically, but not limited to, date of publication, the publication itself, article language, author, number of words in the article. These attributes are usually available from the media source delivering the article. Similar to the article record itself, the publication in which it appears has certain attributes of interest: publication type (broadsheet, trade press, newswire), geographic reach, prestige/authority/circulation, etc. These publication attributes represent a separate set from the article attributes.

In addition to the above mentioned properties, the "reason" why a particular article is of interest is usually because it discusses a certain topic, product, company, person, etc. These will define the terms, called subjects here, used to narrow a search bringing up the individual articles. In most cases one is interested in quantitative comparisons between, say, products or companies, so within an analysis task these terms will be permutated (e.g. each company with each product class) to form a specific set of searches. Thus, typical quantitative analysis might be done for a client against N competitors, $c_n$ with n=0, . . . , N where $c_0$ denotes the client. To be investigated are a number of M subjects (or subject combinations), $s_m$ with m=0, . . . , M with $s_0$=Ø (all mentions of $c_n$) and their relation with K article or publication attributes (or attribute combinations), $\alpha_{m,k}$ with k=0, . . . , $K_m$ and $\alpha_{m,0}$=Ø (all mentions of $c_n \cap s_m$) discussed in $\{p_p\}$ publications (or categories of publications). The selected attributes could be any of the article or publication attributes such as time of publication, geographies, type of publication, etc. The set of attributes may well be different for each subject $s_m$ but subjects and attributes per subject ought to be the same for all competitors $c_n$.

Figure 1:
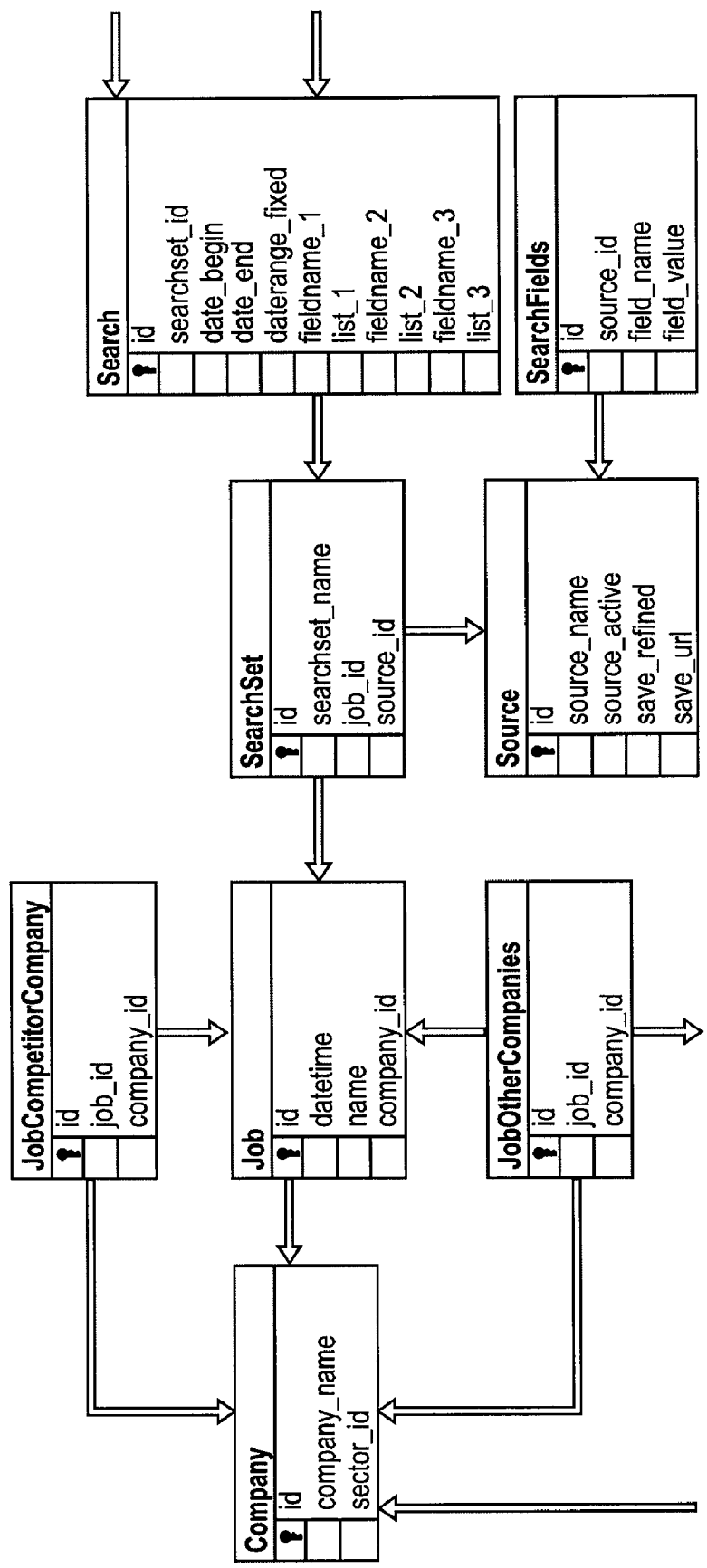
FIG. 1: Example database schema for article searches

The search delivers a set of records $\{r_i(c_n,s_m,\alpha_{m,k})\}$ of news items matching these subjects and attributes. Thus, a record in the article data set would consist of the following entries: $r_i$={project name, search set, search terms, date, publication, language, number of words, title, body}. A sample embodiment of a possible data table set-up is provided in FIG. 1.

Figure 2:
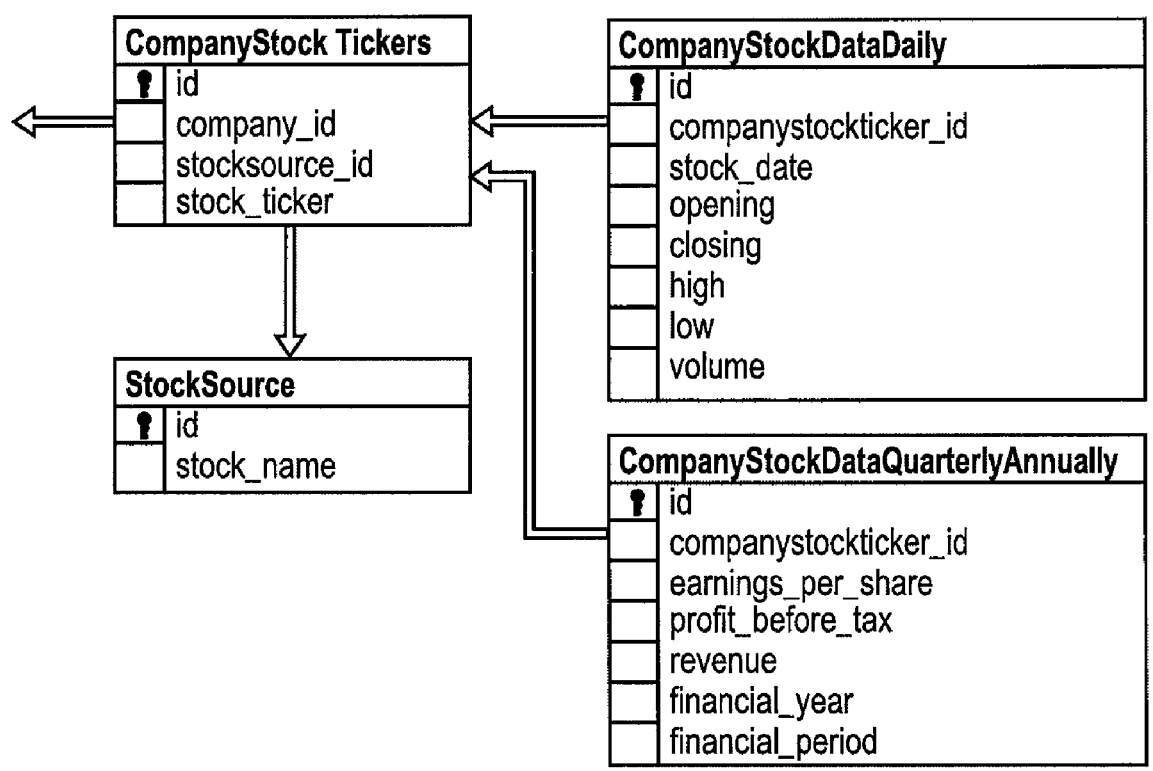
FIG. 2: Company related financial data tables

Financial data sets: For studies comparing a client (product) with competitors, basic financial and business data is needed to correlate the media search results to such properties as company size and events. Such data sets typically consist of size of the company/division (by revenues, employees), market share, share price. FIG. 2 shows an embodiment of financial data table layout. This financial data is also used to normalise certain search results, e.g. number of articles per revenue dollar or percent market share. This normalisation enables one to see who is "punching above/below their weight". Data sets containing events such as reporting dates of quarterly or yearly financial results for publicly listed companies are also useful to explain a flurry of articles at certain times.

Benchmarking data sets: By nature of PR work, the output is publicly visible in terms of media coverage etc. In order to measure efficiencies one needs information about the process "input", which is typically proprietary information such as PR budget, size/number of employees in communications department etc. Newswires typically charge companies for the publication service of their press releases, and with a larger budget and staff a company is able to get more press releases published this way. Newspapers then decide which of these press statements contain information useful to their readers, and it is these articles in the general or specialist press which are potentially beneficial or destructive to a company's reputation. How much "traction" (press releases published by newswires being picked by newspapers to feature in an article) a company achieves is therefore a valuable insight into the efficiency with which it uses its PR budget, and measuring the efficiency lays the foundation for improving the communications operation.

Figure 3:
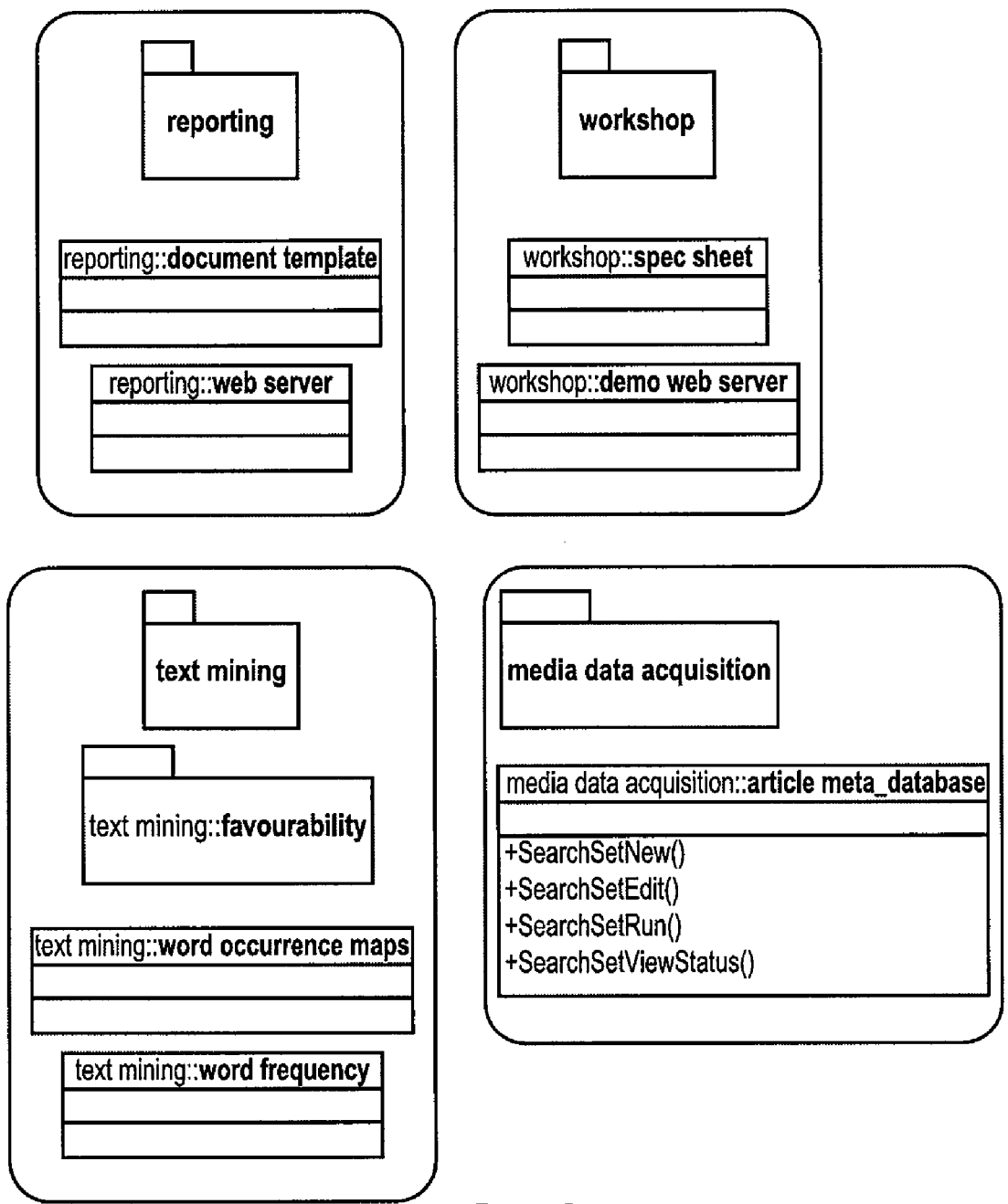
FIG. 3: Overview of tools packages with sample applications
Figure 4:
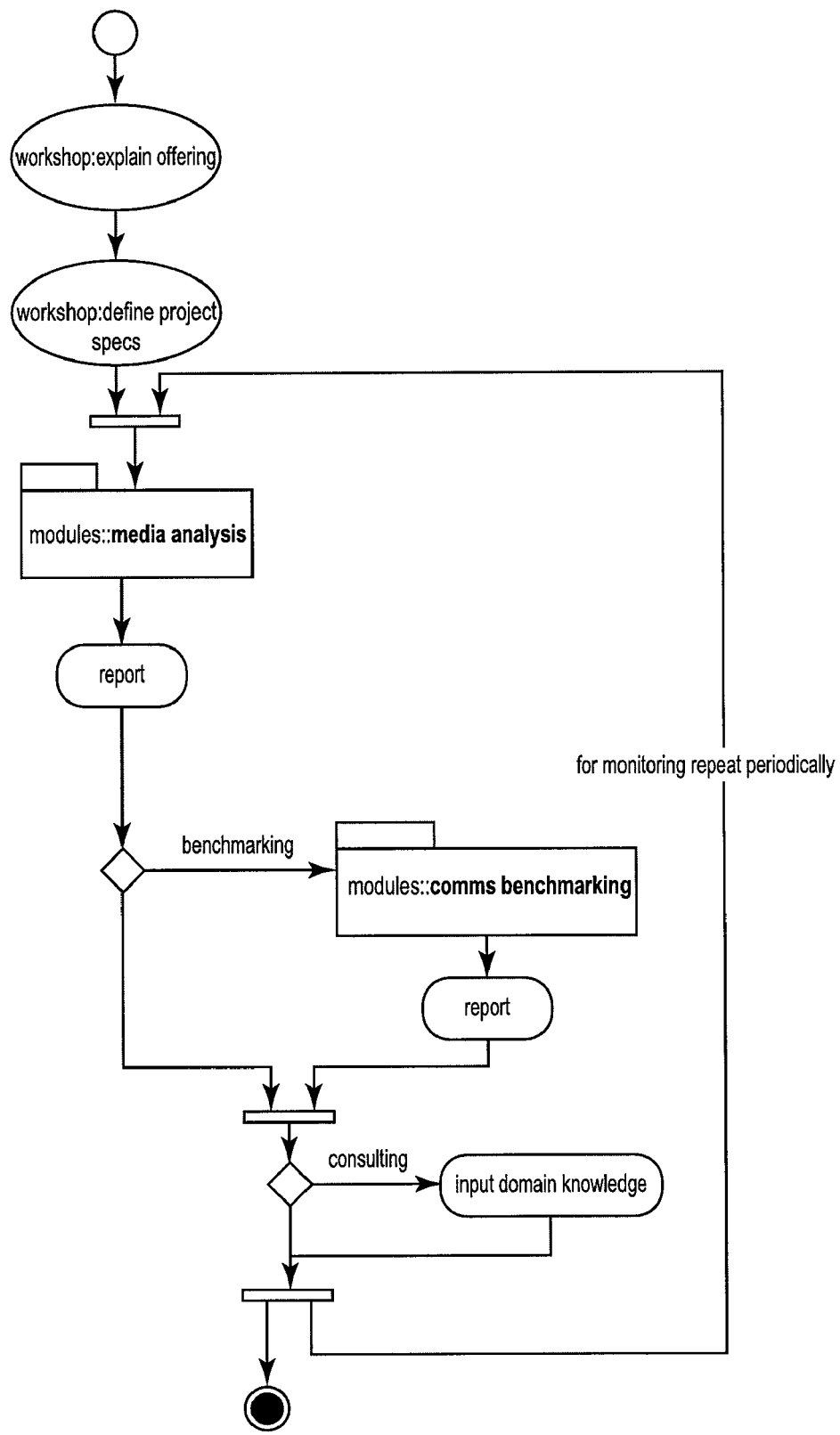
FIG. 4: Overview of project work-flow

Tools: While it is possible to do an entire quantitative media analysis manually, this would be very cumbersome and error prone. In conjunction with the invention, tools have been designed that make the background processing as painless as possible. An overview of a few key tools, grouped in packages, is given in FIG. 3. The tools can be grouped into sections of the overall workflow (see also FIG. 4): customer interaction is aided by online specification sheets and interactive demonstration tools of the quantitative analysis methodology, media analysis uses data acquisition and text mining tools, benchmarking incorporates the use of further proprietary data, and finally reporting and visualisation tools transmit the results back to the customer.

Data acquisition and housekeeping: Depending on the type of analysis to be run, there are a number of searchable media sources available. These can vary from freely accessible Usenet discussion fora or internet search engines, to commercial offerings of world-wide aggregators of publications (electronic versions of printed press or online articles). The choice of media source determines which sort of article attributes are available. Depending on the analysis requirements, availability of the attributes has an impact on the number of search runs. The total number of individual search runs x is typically equal to X=M(N+1), where N+1 is the number of companies/products (client+N competitors) and M the number of subjects. In the worst case, some article attributes of interest are not available at all, reducing the degree of automation of the analysis process. In the best case, all relevant attributes are provided with the articles. Frequently, the attributes are not delivered as part of the article itself but are a selectable feature of a search run, the total then comes to $$X = (N+1)\sum_{m=0}^{M}(K_m+1)$$

where K is the number of selected attribute sets. A sample entry page for search attributes (date range, publisher, language, etc) is given in FIG. 5. After setting up the search set the individual search permutations are generated and executed sequentially on the desired aggregator. The search parameters are stored automatically and can easily be rerun for updates or edited, an example of a table holding the stati of searches is given in FIG. 6.

Favourability: As there is currently no established method whereby a piece of software algorithm can determine the favourability of an article toward a product/issue/client, a favourability analysis needs human intervention. The current tool is based on the assumption that a large enough randomly selected subset will provide a very similar favourability picture as the full set. Hence the reviewer will only need to rate the subset of articles (the tools cross-checks that the random sample represents a proportional selection of publication types, languages, dates or whatever attributes may be active for that particular search set). The tool cycles through the sample subset of articles and presents the reviewer (see FIG. 7) with a choice of classifying the article as "positive", "neutral", and "negative".

Word Frequency: Keeping track of the words used in a set of articles (excluding the most frequently used words in a language, sample user interface in FIG. 8), one can plot the changes in occurrence/frequency of use over time as a coloured map, where the colour represents a sharp/modest increase/decrease of the tracked word. The area allotted to a particular word is proportional to its use. Based on thousands of articles as input, one immediately gets an impression on what the discussion is about (most frequently used words have largest area), and tracked over time how the tone of discussion may be shifting (colour changes, e.g. dark red=sharp increase, red=increase, grey=no change, green=decrease, dark green=sharp decrease). Known text mining tools such as tree maps, as, to expose associated issues, and document cluster plots, can be gainfully employed to further aid the "discovery" part of the analysis process.

Figure 9:
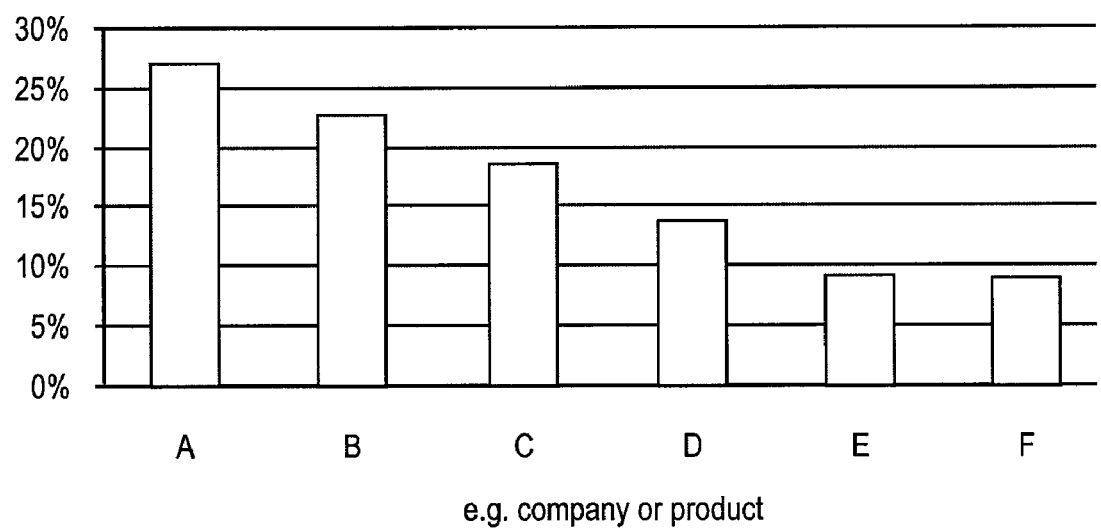
FIG. 9: Share of Voice per company of a particular subject
Figure 10:
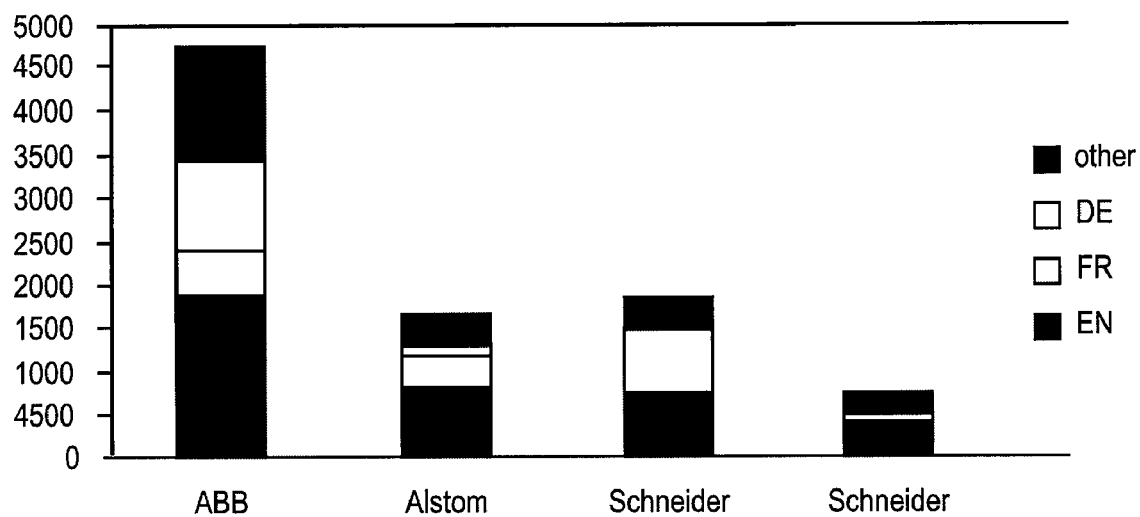
FIG. 10: Share of Voice per company of one subject (electrical equipment) and one attribute (language)

Visualisation of Results: From the base of data records, the number of obtained hits $h_{n,m,k}(\Delta t_l)$ can be summed up over daily, weekly, or monthly blocks of time $\Delta t_l$ with l=1, ..., L, on any level of detail $h_{n,m,k}(\Delta t_l)$ or $h_{n,m}(\Delta t_l)$ or $h_n(\Delta t_l)$. Examples of various types of graphs are shown in FIG. 9 to FIG. 15. FIG. 9 shows a simple bar chart of a volume of articles $$V_{n,m} = \sum_{l=1}^{L} h_{n,m,0}(\Delta t_l)$$

related to a set of companies (n=0, ..., 5) and their data storage offering (m=1). FIG. 10 further distinguishes the articles by one of their attributes (k=0, ..., 3), in this case language $$V_{n,m,k} = \sum_{l=1}^{L} h_{n,m,k}(\Delta t_l)$$

Figure 11:
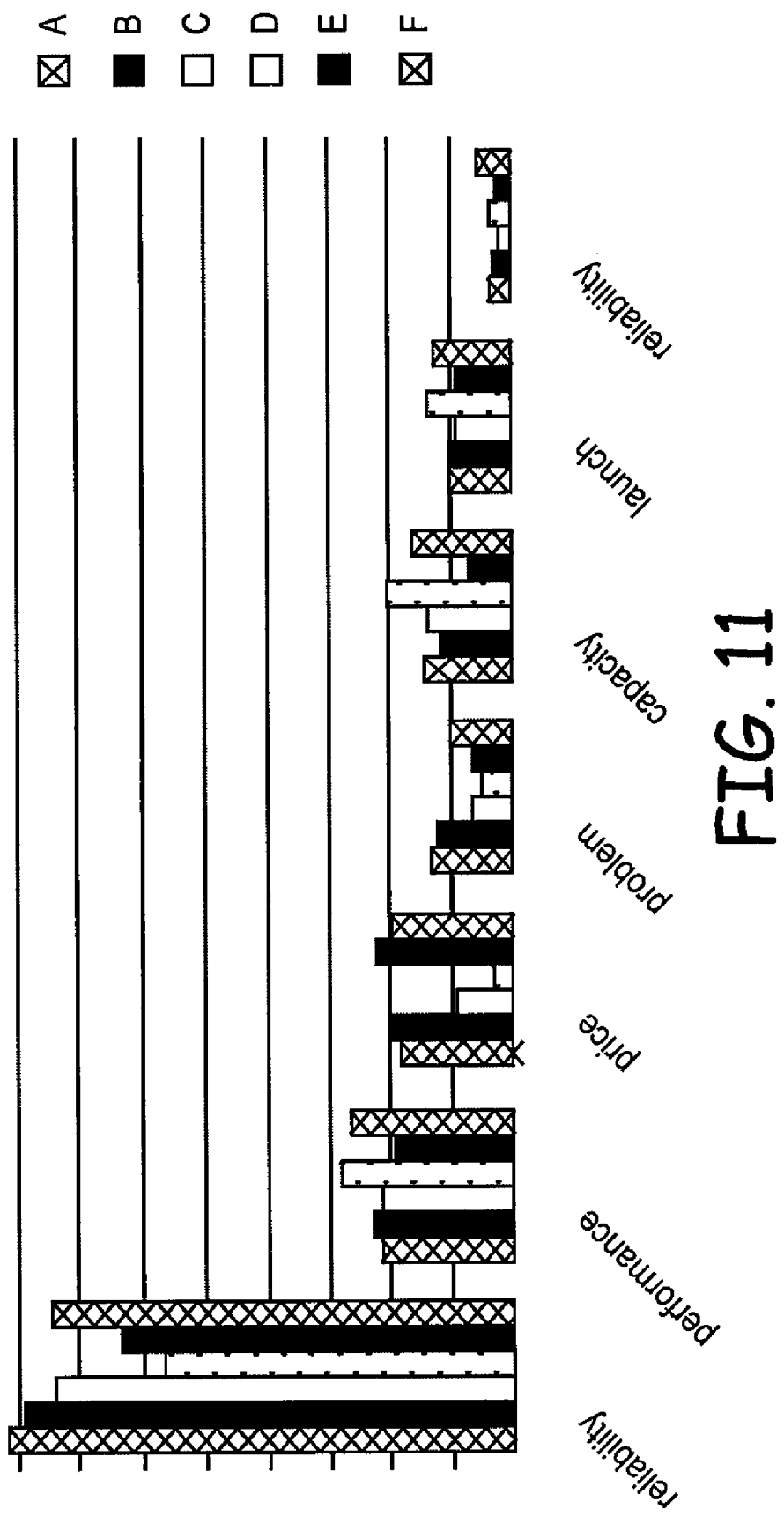
FIG. 11: Relative perceived performance of companies to a set of attributes
Figure 12:
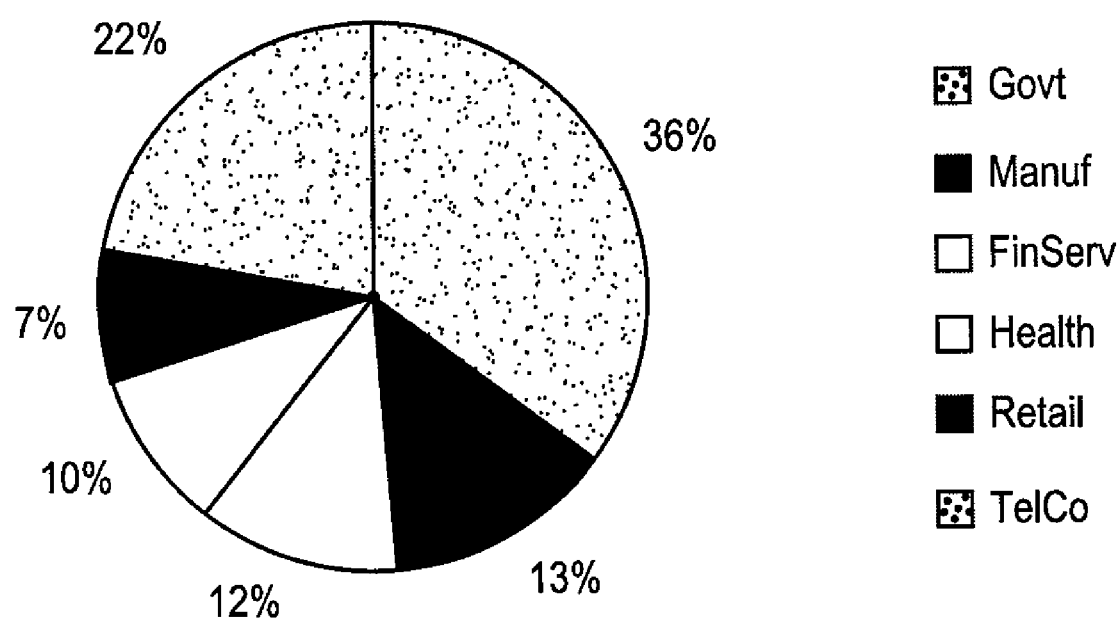
FIG. 12: Relative media performance of a company in various sectors
Figure 13:
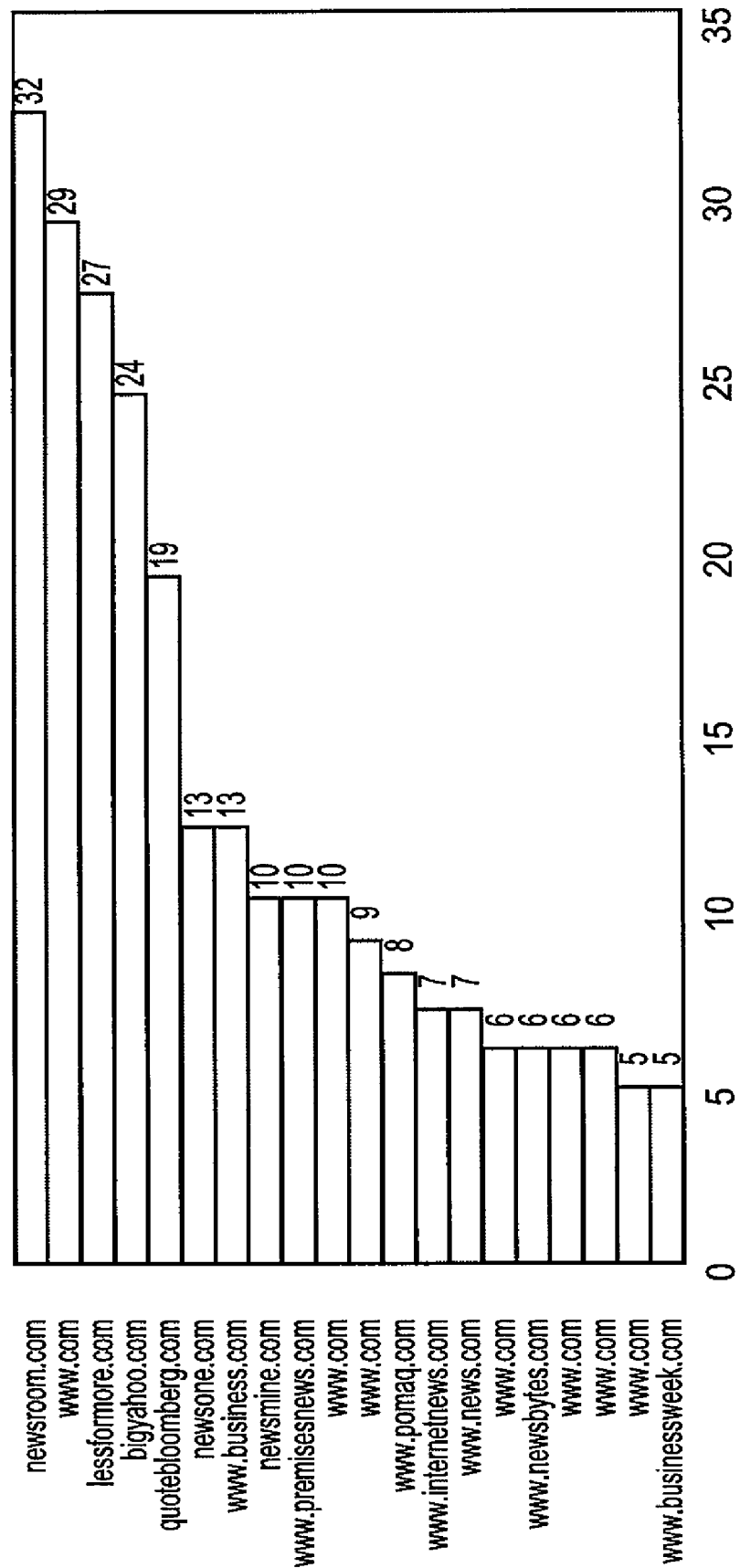
FIG. 13: Most frequent article sources
Figure 14:
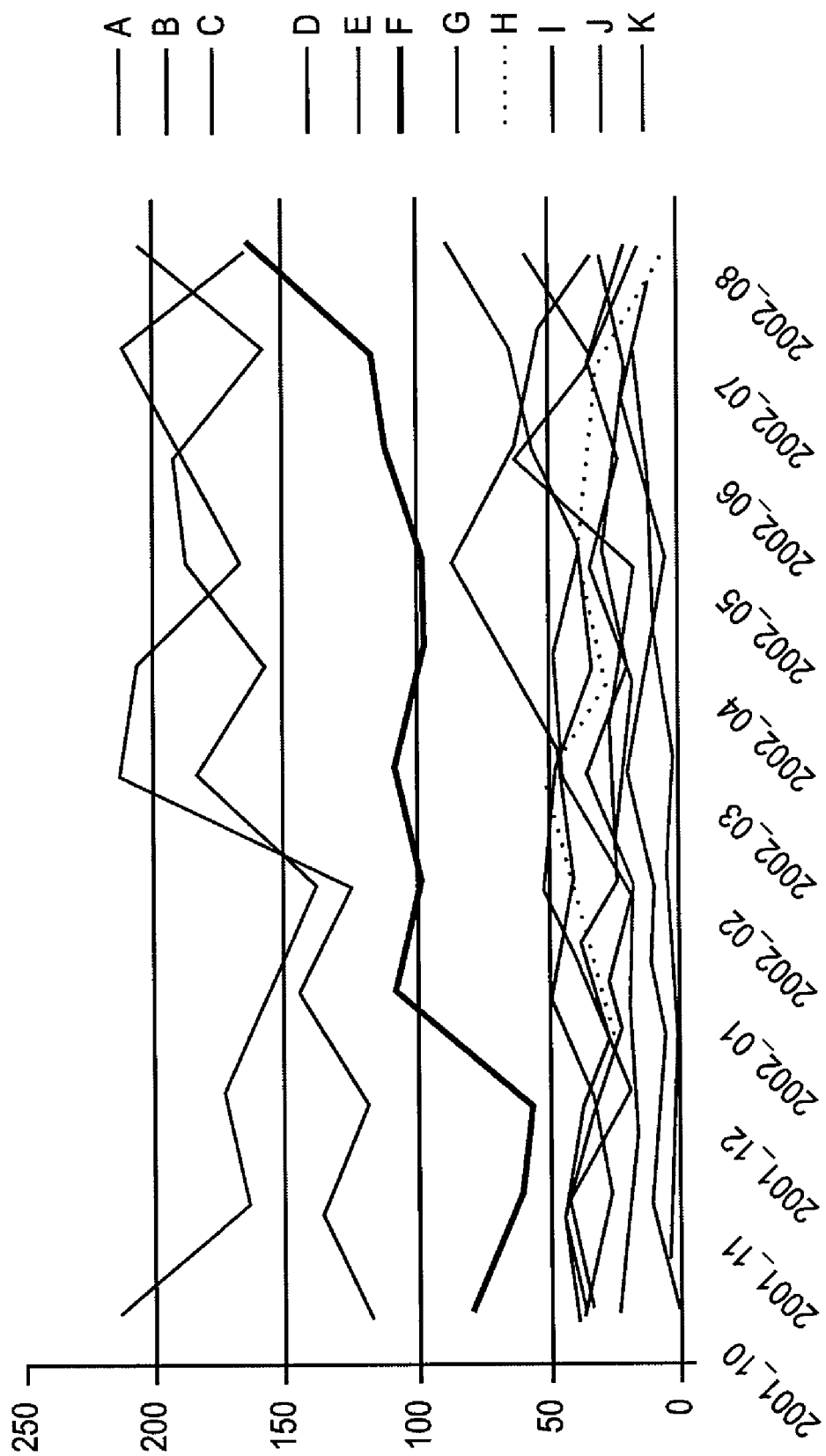
FIG. 14: Number of hits vs time
Figure 15:
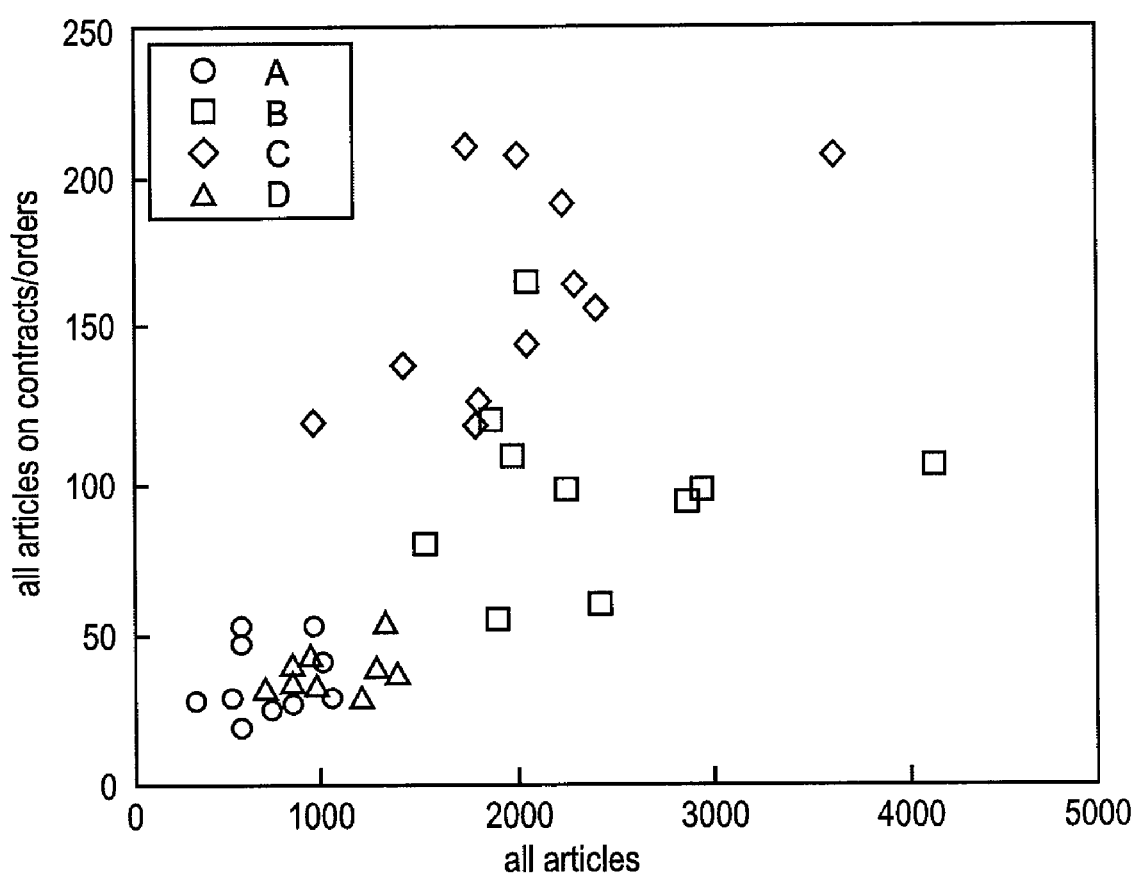
FIG. 15: Clusters of hits in one category vs another

FIG. 11 compares certain qualities such as reliability and performance of companies' offering (m=1, ..., 7). FIG. 12 shows the share of articles of won IT service contracts with certain industries. FIG. 13 shows an ordered listing of those publication sources where the most articles of a search set were published. FIG. 14 shows the volume of articles about one certain subject over time, $h_{n,i}(\Delta t_l)$, and FIG. 15 shows the clustering of articles in one category (here all about contracts and orders, $h_{n,1,0}(\Delta t_l)$) versus another (totality of articles, $h_{n,0,0}(\Delta t_l)$). However, the invention is not limited to those types of graphs, examples of other useful types of graphs not shown here are the scatter matrix, bubble charts, radar plots, and Venn diagrams.

Figure 16:
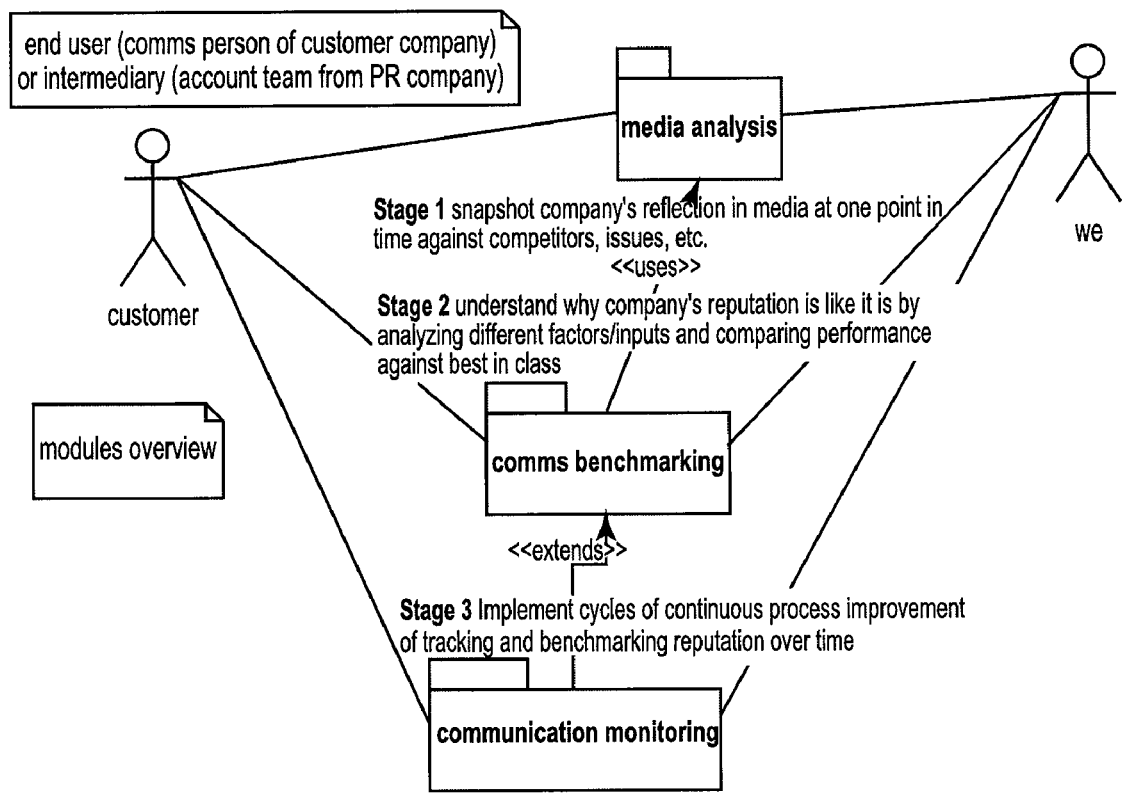
FIG. 16: Overview of frequent use cases
Figure 17:
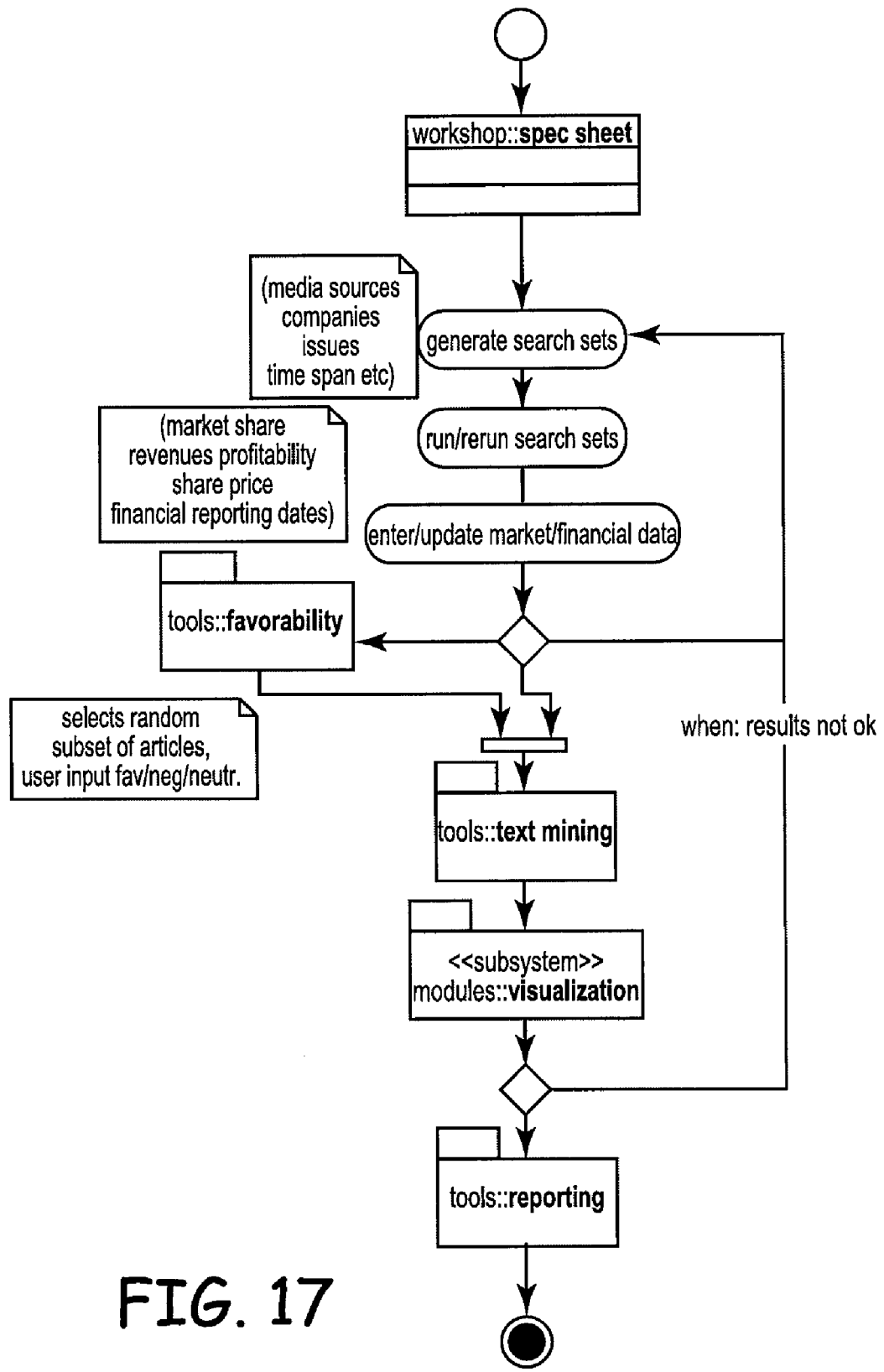
FIG. 17: Sketch of media analysis process
Figure 18:
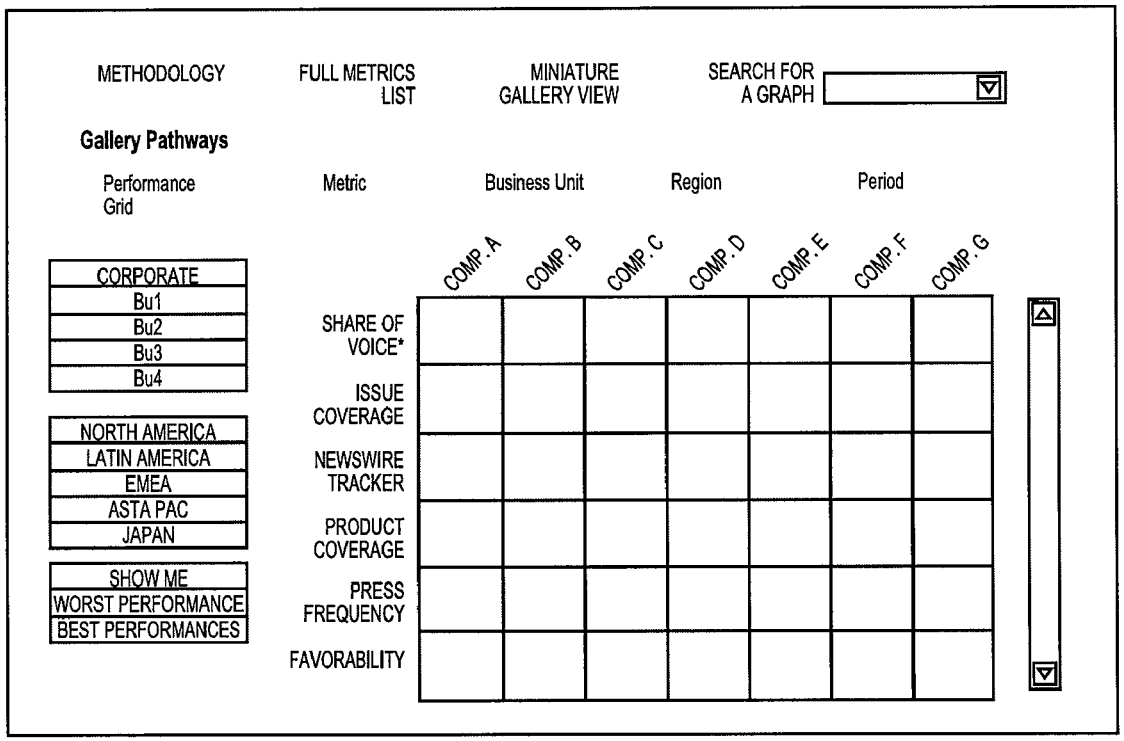
FIG. 18: Example user interface to gallery of graphs

Business processes for communications improvement: The service delivered to the customer can broadly be described in 3 stages (see also FIG. 16 and workflow in FIG. 4):

(1) An initial snapshot of the current media coverage a customer is getting, with any desired resolution in terms of geography, issues, type of publications, all which can be compared to results competing companies achieve. Media analysis project brief and setup of data gathering: (overview see FIG. 17): Aiding the communication between client (or client-facing PR team) and analysis supplier is the following web-based checklist to be filled out jointly by both parties. The values in the checklist can be automatically transferred to provide draft search sets, the starting point of the analysis process step. Usually the project brief will need to be augmented so that the resulting data on which any further analysis is based is a fair representation of the original intention. Note that it might be necessary to augment the search parameters with some exclusions, such as "NOT share price" or "NOT stock market" or in case of a web search the companies' home pages, to filter out what might otherwise be dominant noise on the data. Thus the setup of the search terms for the data gathering is an iterative procedure, as is the layout of a mockup web page with a gallery of graphs, which provides easy navigation and custom positioning to facilitate direct comparisons between search results (by competitors, regions, product class, date, etc). Interpreting the data is obviously a creative process, aided by visualisation and text mining tools, examples of which are described above.

(2) This snapshot may lead to a number of open questions, where the follow-up of these is the second stage. Together with the customer, research is conducted to explain the current media profile, in particular taking into account "input" measures (effort, budget, ...) a customer puts into PR. Using financial data available and linked to companies in article database to set media coverage in context with company/competitor size etc. Proprietary benchmarking data may be available to provide graphs on efficiencies, which can be compared to best-of-class results.

(3) The third stage is implementing monitoring tools that enable continuous process improvement in PR efficiency. Regularly monitoring PR input and media output is a prerequisite for cycles of learning of how to optimise a company's communication with its stakeholders. The aforementioned analysis cannot only be carried out as one-shot. Once the search and visualisation tools have been set up, these can be rerun on a regular basis (hours, days), yielding up-to-date information and thereby enabling real-time tracking. This facilitates continuous process improvement as the effect of modified input parameters on the media output can be measured. One embodiment of such a monitoring setup is an interactive web site, which lets the client select the issues of interest, with the system going through a pre-configured process to provide up-to-date graphs. Some customers may appreciate additional consulting services related to the implementation of the methodology described herein into their own workflow, interpretation of results, in particular in comparison to their competitors, yielding concrete action items of how to optimise their corporate communications.

The invention claimed is:

1. A method of quantitative analysis of communication performance of an entity, comprising:
conducting a computerized search of publications stored in one or more electronic databases or accessible via a computerized network to identify results of said search, said results comprising one or more publications relating to the entity;
using a computer processor to assign each identified publication a quantitative weight value based upon attributes associated with the identified publication;
using the computer processor to analyze the identified publications and generate a quantitative analysis of the communication performance of the entity, wherein the quantitative analysis is based upon the number of identified publications, the word count of the identified articles, the weight values of the identified articles, and a number of mentions of the entity in each identified publication; assigning a favorability classification to the identified articles; and generating a graphic display of the quantitative analysis.

2. The method of claim 1, further comprising storing financial data concerning the entity in an electronic database, wherein the stored financial data is used to generate the quantitative analysis of the communication performance of the entity.

3. A method of quantitative analysis of communication performance of a client business entity using a computing system, comprising:

submitting an electronic query to a searchable media source containing articles in electronic media format, the articles having metadata associated therewith, the query comprising:
  at least one metadata attribute, wherein a metadata attribute comprises information regarding an article or information regarding an article's publication;
  at least one subject, wherein a subject comprises a term or phrase of interest in assessing communication performance;
  the client business entity; and
  at least one competitor, wherein a competitor comprises a business entity;

receiving from the searchable media source a search result comprising electronic information, where the electronic information comprises articles or other publications contained with the media source which match the query, and metadata associated therewith;

processing the received search result comprising electronic information by:
  (i) normalizing the received electronic information by electronically associating data representing financial information about a competitor with any received articles or publications related to the competitor;
  (ii) benchmarking the received electronic information by electronically associating data representing communications information about the client business entity with any received articles or publications related to the client business entity, wherein communications information comprises a communications department budget, a size of the communications department, or a number of employees in the communications department;
  (iii) electronically receiving data representing a favorability classification of each article or publication in the received information, and electronically associating the classification with the article or publication to which it corresponds;
  (iv) electronically implementing one or more data processing procedures on the received electronic information, the data processing procedures comprising associating articles or publications with like metadata attributes, associating articles or publications with like subjects, associating articles or publications with like competitors, or associating articles or publications with like favorability classifications; and displaying the processed search result comprising electronic information in electronic graphical format on a display device operably connected to the computing system.

4. The method of claim 3, wherein the metadata attribute is selected from the group consisting of: date of publication, publication name, article language, author, number of words, publication type, geographic reach, and circulation.

5. The method of claim 3, wherein financial information is selected from the group consisting of: size of the competitor or division of the competitor by number of employees, market share, share price, and revenue amount.

6. The method of claim 3, wherein associating articles or publications with like subjects comprises a word frequency analysis.

7. The method of claim 3, wherein associating articles or publications with like subjects comprises implementing a phrasal tree map.

8. The method of claim 3, wherein displaying the analyzed electronic information comprises providing one or more formats selected from the group consisting of: cluster plots, graphs, scatter matrices, bubbles charts, radar plots, and Venn diagrams.

9. The method of claim 3, wherein the received electronic information is saved or stored in a data storage device operably connected to the computing system.

10. The method of claim 3, wherein the searchable media source is selected from the group consisting of: a Usenet discussion forum, an internet search engine, and a worldwide aggregator of publications.

11. The method of claim 3, wherein the quantitative analysis of communication performance is repeated at an interval of time, thereby measuring changes in the analysis over time.

12. The method of claim 3, wherein the favorability classification is selected from the group consisting of: positive, neutral, and negative.

13. The method of claim 3, wherein the query of the at least one subject comprises an excluded subject.

* * * * *

UNITED STATES PATENT AND TRADEMARK OFFICE
CERTIFICATE OF CORRECTION

| | |
|---|---|
| PATENT NO. | : 8,078,616 B2 |
| APPLICATION NO. | : 10/604906 |
| DATED | : December 13, 2011 |
| INVENTOR(S) | : Goetz von Groll |

Page 1 of 1

It is certified that error appears in the above-identified patent and that said Letters Patent is hereby corrected as shown below:

| | | | Should Read |
|---|---|---|---|
| Title Page: Item (57) Abstract: | | "in a "cock-pit" style manner." | -- in a "cockpit" style manner. -- |

In the Specifications:

| | | | |
|---|---|---|---|
| Col. 2, | Line 14, | "in a "cock-pit" style" | -- in a "cockpit" style -- |
| Col. 2, | Line 63, | "(iii) bench-marking" | -- (iii) benchmarking -- |
| Col. 4, | Line 26, | "Usenet discussion for a or" | -- Usenet discussion fora or -- |
| Col. 5, | Line 17, | "tree maps, as, to expose" | -- tree maps to expose -- |
| Col. 5, | Line 18, | "cluster plots, can be" | -- cluster plots can be -- |

Signed and Sealed this
Twenty-seventh Day of March, 2012

David J. Kappos
*Director of the United States Patent and Trademark Office*